United States Patent [19]

Coetzer

[11] Patent Number: 5,269,988
[45] Date of Patent: Dec. 14, 1993

[54] ELECTROLYTE HOLDER

[75] Inventor: Johan Coetzer, Pretoria, South Africa

[73] Assignee: Programme 3 Patent Holdings, Luxembourg

[21] Appl. No.: 16,025

[22] Filed: Feb. 10, 1993

Related U.S. Application Data

[62] Division of Ser. No. 773,322, Oct. 9, 1991, Pat. No. 5,221,542.

[51] Int. Cl.$^5$ ............................................. C04B 35/64
[52] U.S. Cl. ..................................... 264/56; 264/313; 264/318; 264/109; 264/125
[58] Field of Search .................. 264/56, 313, 318, 109, 264/125

[56] References Cited

U.S. PATENT DOCUMENTS

| | | | |
|---|---|---|---|
| 3,084,086 | 4/1963 | Roberts et al. | 425/117 |
| 3,194,705 | 7/1965 | Caplan | 425/441 |
| 4,049,885 | 9/1977 | Mitoff | 429/104 |
| 4,165,350 | 8/1979 | Greenberg | 264/60 |
| 4,268,472 | 5/1981 | Nightingale | 264/392 |
| 4,279,974 | 7/1981 | Nishio | 429/104 |
| 4,424,262 | 1/1984 | von Alpen et al. | 429/8 |
| 4,568,502 | 2/1986 | Theodore et al. | 264/63 |
| 4,673,158 | 6/1987 | Hannon | 425/441 |
| 4,732,741 | 3/1988 | Duncan et al. | 423/119 |
| 4,787,596 | 11/1988 | Folding | 249/122 |

FOREIGN PATENT DOCUMENTS

| | | |
|---|---|---|
| 400281 | 10/1933 | United Kingdom . |
| 477287 | 12/1937 | United Kingdom . |
| 1374073 | 11/1974 | United Kingdom . |
| 1422702 | 1/1976 | United Kingdom . |
| 1449349 | 9/1976 | United Kingdom . |
| 2018013A | 10/1979 | United Kingdom . |
| 2210612A | 6/1989 | United Kingdom . |
| 2226181A | 6/1990 | United Kingdom . |
| 2231567A | 11/1990 | United Kingdom . |

OTHER PUBLICATIONS

Seo et al., "Investigation of High Temperature Battery Systems," *Technical Report ECOM-0312-F*, Jan., 1974.
Prepared by TRW Systems Group, TRW Inc., "Development Program for Solid Electrolyte Batteries," Research Project 127-2, Interim Report for the period Jul. 1, 1974 to Jun. 30, 1975.
Pett et al., "Plate-Type Beta" Alumina Electrolytes for an Advanced Sodium-Sulfur Cell Design," *Am. Ceram. Soc. Bull.*, 64(4):589–592, 1985.

*Primary Examiner*—James Derrington
*Attorney, Agent, or Firm*—Arnold, White & Durkee

[57] ABSTRACT

The invention provides a method and apparatus for making an electrochemical cell solid electrolyte holder. A layer of solid electrolyte powder or its precursor is formed around an externally screw threaded mandrel. The powder is pressed to form the holder in a green state with internal threads formed by the mandrel. The mandrel is screwed axially out of the green holder, after which the green holder is sintered. In the apparatus there is a mandrel which has external threads, and a flexible sheath. The mandrel is receivable in the sheath to provide an annular space around the mandrel for receiving a powder to be isostatically pressed by the sheath. The space is provided between the sheath and a mold, but can, instead, be provided between the mandrel and sheath, or between two sheaths between the mold and mandrel.

7 Claims, 3 Drawing Sheets

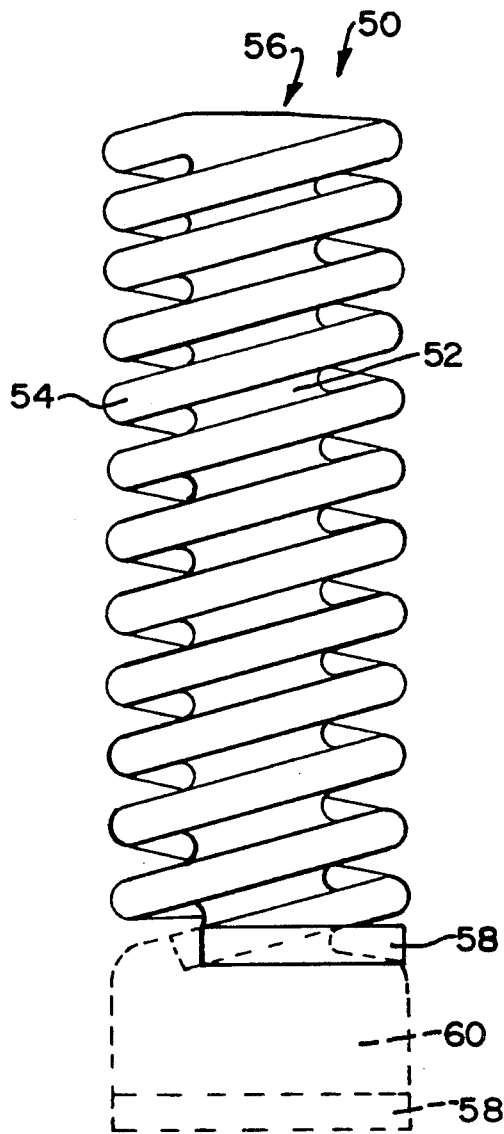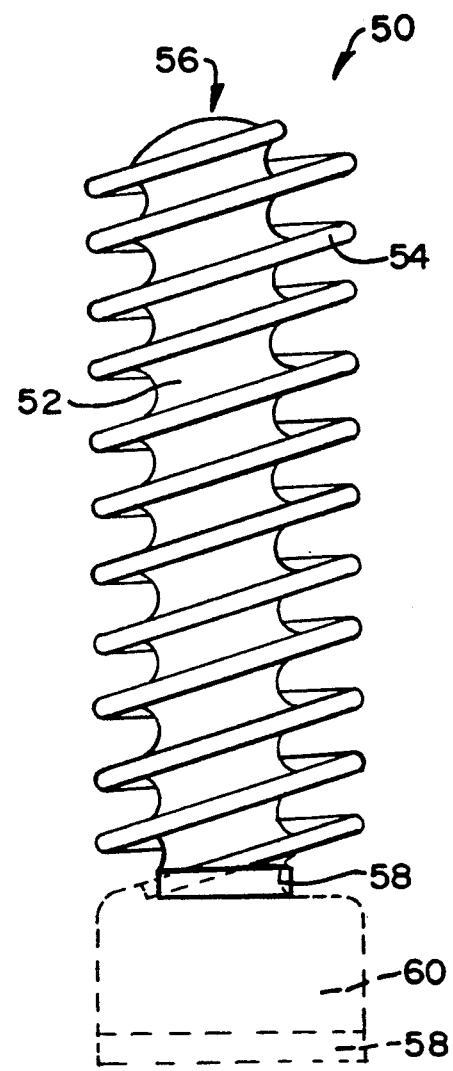
FIG 3
FIG 4

ELECTROLYTE HOLDER

This is a divisional of co-pending application Ser. No. 07/773,322, filed Oct. 9, 1991, now U.S. Pat. No. 5,221,542.

THIS INVENTION relates to a solid electrolyte holder for an electrode for an electrochemical cell. More particularly it relates to a method of making such solid electrolyte holder; to an apparatus for making such holder; and to a solid electrolyte holder when made in accordance with the method.

According to one aspect of the invention there is provided a method of making a solid electrolyte holder for an electrode for an electrochemical cell, the method comprising the steps of:

forming a layer of particulate material comprising a solid electrolyte or a precursor thereof around a mandrel which is externally screw threaded;

isostatically pressing the layer of particulate material to form the holder in a green state with internal screw threads formed by the threads of the mandrel;

unscrewing the mandrel in an axial direction from the green holder; and sintering the green holder to provide the holder in the form of a unitary, polycrystalline ceramic solid electrolyte artifact.

While the particulate material may in principle be in the form of a slurry, it is preferably in the form of a powder, in particular a free-flowing powder.

The isostatic pressing will typically be by means of hydrostatic pressure transmitted to the powder by a resiliently flexible membrane such as a latex or polyurethane sheath in which the mandrel is received. Pressing will usually be to a pressure of $10 \times 10^3 - 30 \times 10^3$ psi, preferably $12-18 \times 10^3$ psi, e.g. $34 \times 10^3$ psi (1 psi = 6,894757 kPa). Essentially, the method can employ either of two broad approaches, the first being to press the sheath against the layer of powder in a direction inwardly towards the mandrel and the second being to press the sheath against the layer of powder in a direction outwardly away from the mandrel. In each case a suitable mould, e.g. a split mould, may be employed around the mandrel, the mould being internally screw threaded and shaped so that the mandrel can be located more or less concentrically therein with the threads of the mandrel and the threads of the mould in register so as to define an annular space therebetween for receiving the powder to be pressed in the form of a layer of desired thickness and shape.

In accordance with said first approach, the particulate material may be a powder, the layer of powder being isostatically pressed against the mandrel by means of a flexible sheath enclosing the mandrel and layer of powder. Thus, the sheath may be enclosed in a mould, the sheath being resiliently flexible and, prior to the pressing, forming a lining for the mould, the powder being charged into a space between the sheath and the mandrel to form the layer of powder, the pressing being by fluid introduced into the mould outside the sheath, and fluid pressure being relieved after the pressing to allow the sheath resiliently to spring back, free of the green holder, to form a lining for the mould, after which the mandrel and green holder are respectively unscrewed from the holder and removed from the mould.

More particularly in accordance with said first approach the sheath may be shaped to abut and form a lining for the mould, the mandrel sheath and mould being vertically aligned with the bottom of the annular space closed off and the powder being charged downwardly from the top into the annular space between the sheath and mandrel, with vibration to consolidate and compact it, the top of the annular space then being closed off when said when said space is filled with powder and the sheath being isostatically pressed inwardly against the layer and mandrel by water passing under pressure through suitably located pinholes in the mould. After the pressing the sheath can spring back resiliently to line the mould, free of the pressed green holder, and the mandrel can then be unscrewed from the green holder and the holder can be removed from the mould. If desired the mandrel can first be unscrewed from the green holder, followed by removal of the green holder from the mould, or vice versa. Removal of the green holder from the mould may be by unscrewing the green holder from the mould or, if the mould is a split mould, by splitting the mould. To facilitate the unscrewing, either or both of the mandrel and mould may be tapered from a broad end to a narrow end, the unscrewing being in an axial direction from the narrow end to the broad end.

Naturally, instead of using a relatively thin sheath in a mould, the mould and sheath can be combined into a single unit, made of latex or polyurethane, which can be regarded as a thick self-supporting sheath, or as a thin, resiliently, flexible self-supporting mould. This can be located around the mandrel, filled with powder and pressed, after which it springs, resiliently free of the pressed green holder, to permit easy unscrewing of the green-holder therefrom.

In accordance with said second approach the particulate material may similarly be a powder, the layer of powder being isostatically pressed outwardly away from the mandrel against a mould enclosing the layer of powder, by means of a flexible sheath enclosing the mandrel and located between the mandrel and the layer of powder. Thus, the sheath may be resiliently flexible and, prior to the pressing, forming a lining for the mandrel, the powder being charged into a space between the sheath and the mould to form the layer of powder, the pressing being by fluid introduced into the sheath, between the sheath and the mandrel, and fluid pressure being relieved after the pressing to allow the sheath resiliently to spring back, free of the green holder, to form a lining for the mandrel, after which the mandrel and green holder are respectively unscrewed from the holder and removed from the mould.

More particularly, in accordance with the second broad approach the sheath is shaped to abut and form a lining for the mandrel, the metal sheath and mould again being similarly vertically aligned with the bottom of the annular space closed off and the powder similarly being charged into the annular space from above, in this case, however, between the sheath and the mould, the pressing of the sheath, after closing of the top of the annular space, being outwardly via suitably located pin holes in the mandrel, against the layer and the mould. After the pressing the sheath can spring back resiliently to line the mandrel, free of the pressed green holder. The green holder can then be removed from the mould, and the mandrel unscrewed from the green holder, as described above for the first broad approach.

Naturally, a hybrid approach can be employed, whereby two sheaths are used, respectively lining the mandrel and mould, the powder being charged between the sheaths and the pressing being simultaneously inwardly and outwardly. This hybrid approach has the advantage that, after the sheaths have resiliently sprung back to line the mandrel and mould respectively upon relief of the hydrostatic pressure, the mandrel and green artifact can be relatively easily unscrewed, particularly if the mandrel and mould are tapered.

Thus, in accordance with the hybrid approach, the particulate material may again be a powder, the mandrel and layer of powder being enclosed by a flexible outer sheath located in a mould, a flexible inner sheath being provided between the mandrel and the layer of powder, the layer of powder simultaneously being pressed inwardly by the outer sheath by fluid introduced into the mould outside the sheath, and being pressed outwardly away from the mandrel by the inner sheath by fluid introduced into the inner sheath, between the inner sheath and the mandrel. Each sheath may be resiliently flexible, the inner and outer sheaths, prior to the pressing, respectively lining the mandrel and the mould, the powder being introduced into a space between the sheaths to form the layer of powder and the fluid pressure respectively in the inner sheath and between the mould and the outer sheath being relieved after the pressing to allow the inner and outer sheaths respectively to spring back resiliently to line the mandrel and the mould, after which the mandrel and green holder are respectively unscrewed from the holder and removed from the mould.

When a mould is employed, it may be internally screw threaded, removal of the holder from the mould being by unscrewing the holder in an axial direction from the mould.

Naturally, the screw threads of the mandrel and mould can be provided by a single helical thread, or they may be multi-pitch, employing two or more helical threads.

The powder particle size employed may be such that at least 80% by mass thereof is less than 55 $\mu$m in size, preferably so that a proportion thereof has a particle size of less than 30 $\mu$m.

By a precursor of a solid electrolyte is meant a powder mixture which when sintered, is converted into a solid electrolyte, while forming a polycrystalline artifact. Numerous such precursor powder mixtures are well known in the art of electrochemical cell solid electrolyte separators and it is to be emphasized that any suitable powder comprising such a precursor, or the solid electrolyte itself, can be employed, the sintering step also being conventional and the novel features of the invention relating to the actual formation of the green holder.

After removal of the mandrel from the green holder and removal of the green holder from the mould, the green holder can be sintered by heating in the usual way to a suitable sintering temperature of e.g. 1550°-1700° C., typically 1600°-1630° C., as described, for example in U.S. Pat. No. 4,732,741. This may be effected with the green holder with standing on one end or suspended vertically or indeed lying on its side, in each case with relatively little of its surface in contact with whatever is used to support it.

Typically the mandrel will have a root or guide shaft at one end, eg its broad end if it is tapered. The method may thus involve embedding the opposite or narrow end in powder so that the holder has an opening into one end and is closed at the other. In this case a suitable ceramic powder can be charged into the annular space to form a collar at the open end of the tube which can be sintered integrally with the rest of the tube, to provide an ionically and electronically insulating collar for said open end.

In practice, the solid electrolyte will usually be $\beta$-alumina or $\beta''$-alumina, the powder thus comprising $\beta$-alumina or $\beta''$-alumina, or a precursor powder which becomes converted thereto upon heating to the sintering temperature, such as those described in U.S. Pat. No. 4,732,741. In this case the insulating collar can be $\alpha$-alumina, a powder of $\alpha$-alumina or a precursor thereof being used to form the collar of the green holder. Naturally, other types of solid electrolyte holders can be made in similar fashion.

In the usual way, a suitable binder may be employed to bind the powder together to strengthen the green holder. For this purpose the Applicant has found a wax to be suitable, such as a polyethylene glycol wax, which may have a molecular weight of 2000-4000, e.g. 3000, and which is volatilized without disrupting the green artifact during the sintering.

It should be noted that, for the second approach described above, it can be helpful to apply a suitable vacuum between the mandrel and the sheath, to cause the sheath to cling tightly to the mandrel, before the pressing takes place, and this vacuum can be applied again, after the pressing, to aid the sheath in springing back resiliently to line the mandrel, free of the green holder. For the first approach described above, a vacuum can similarly be applied between the sheath and mould, after the pressing, to aid the sheath in springing back resiliently to line the mould, free of the green holder. It should also be noted that, while the invention has particular utility in making electrolyte holders for high temperature cells, it can also in principle be used to make such holders for room temperature cells.

According to another aspect of the invention there is provided an apparatus for use in the method as described above, the apparatus comprising:

a mandrel which is externally screw threaded; and a flexible sheath, the mandrel being receivable in the sheath to provide an annular space around the mandrel for receiving a particulate material to be isostatically pressed by the sheath.

The apparatus will thus be for making a solid electrolyte holder for an electrode in an electrochemical cell, and, as indicated above, the sheath may be shaped or supported to be screw threaded, the mandrel being locatable in the sheath to provide an annular screw-threaded space around the mandrel for receiving a powder to be isostatically pressed by the sheath, the space being bounded, on one side thereof, by the sheath.

The apparatus may include a mould in which the mandrel is receivable with the sheath between the mandrel and the mould and with said space defined in the interice of the mould, between the mould and the mandrel, the mould and mandrel respectively forming radially inner and outer walls of the space; and the mould may be internally screw threaded.

The sheath ray be resiliently flexible, forming a lining for one of said walls of the space. Instead, there may be two sheaths, respectively forming linings for said inner and outer walls of the space.

The mandrel and mould may be correspondingly screw threaded, the mandrel being receivable in the mould with the sheath between the mould and the mandrel and with said space being defined in the interior of the mould, between the mould and the mandrel. Thus, the sheath can be a lining of the mandrel, being supported by the mandrel so that it is screw threaded, the space being defined between the sheath and the mould; or, instead, the sheath can be a lining for the mould, being supported by the mould so that it is screw-threaded, the space being defined between the sheath and the mandrel.

As indicated above, there can be two sheaths, one forming a lining for the mould and the other forming a lining for the mandrel, so that the space is defined between the sheaths. The sheaths may be simple cylindrical tubes which assume the shape of the mould or mandrel which they line, or they nay be shaped to be self-supporting and threaded in shape. Thus, in a simple case, all that is needed is a mandrel located in a shaped self-supporting threaded sheath, powder being insertable therebetween followed by inward pressing of the sheath. Instead, such a sheath can be located in a mould with the powder inserted between the sheath and mould followed by outward pressing of the sheath. However, it is expected that the mandrel and mould will usually be used together, as described above.

The mould may be a split mould. The mould may have an interior which tapers axially, and the mandrel may also taper axially.

In a particular embodiment of the apparatus, it may comprise a hollow cylindrical cuter housing, which may be split, provided with several axially spaced outer ring clamps, the mould having a cylindrical, outer surface and being held in the housing by the clamps. In this case the mandrel can have a cylindrical root which blocks off one end of the housing, a cylindrical plug being used to block off the other end of the housing. The mould can be split, eg into 2 or 3 portions, and the mould, the mandrel and indeed said plug, can each have one or more suitable passages and pinholes for the transmission of hydrostatic pressure to the sheath or sheaths for the isostatic pressing.

The invention extends also to a solid electrolyte holder for holding an electrode of an electrochemical cell, whenever made in accordance with the method described herein.

Typically the holder will have relatively closely spaced threads or fins when it is intended for holding in its interior a molten alkali metal anode such as a sodium anode; and it will have relatively distantly spaced fins or threads when it is intended for holding a cathode.

The invention will now be described, by way of example with reference to the accompanying diagrammatic drawings, in which:

FIGS. 3 and 4 show schematic side elevations of two holders made in accordance with the method of the invention.

Figure 1:
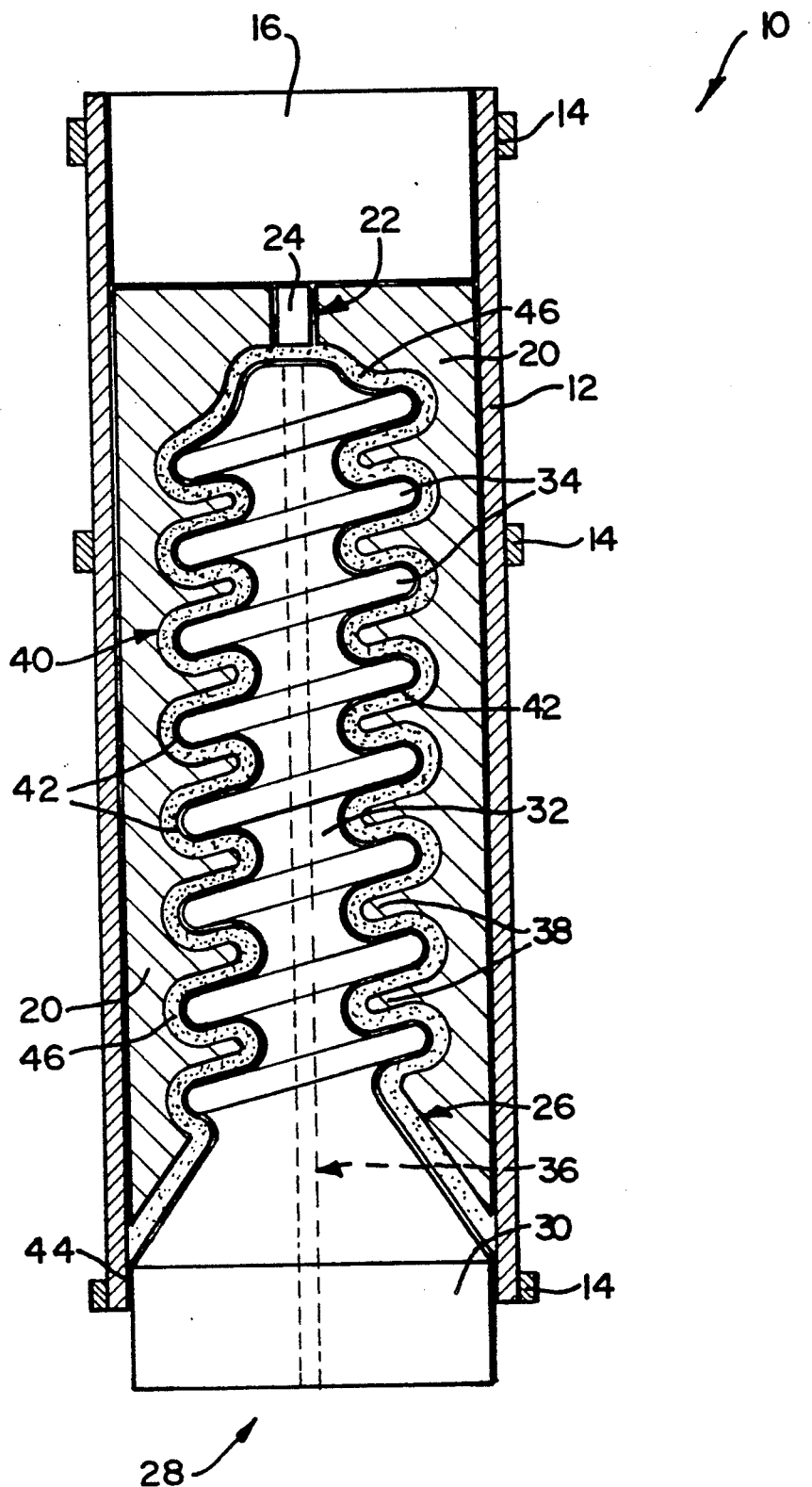
FIG. 1 shows a schematic sectional side elevation of an apparatus according to the invention.

In FIG. 1 of the drawings reference numeral 10 generally designates apparatus in accordance with the present invention for use in the method of the present invention. The apparatus 10 is in the form, of a pressing jig comprising a hollow cylindrical mold steel outer housing 12 which is split longitudinally, and has its portions held together by outer steel ring clamps 14. The jig 10 is shown in an upright operative condition with its upper end closed off by a cylindrical resiliently flexible latex plug 16. Instead of latex, flexible polyurethane may be used for the plug 16.

Located concentrically in the housing 12 below the plug 16 is a longitudinally split mould 20, having portions which are held together by the housing 12. The top of the mould 20 has a central opening 22 closed by a plug 24 of similar material to that of the plug 16. The mould 20, as described in more detail hereunder, has a hollow screw-threaded interior into which the opening 22 leads, the mould 20 having a mouth 26 at its lower end, leading into said interior.

A screw-threaded mandrel 28 is shown located concentrically in the hollow interior of the mould 20, loosely screwingly engaged therewith. The mandrel 28 has a root 30 received in the mouth 26, and a central shank or stem 32 which is provided with a helically extending screw thread 34, extending from the root 30 to the opposite end of the stem 32. The stem 32 has a central passage 36 from which a multiplicity of pinholes (not shown) lead radially outwardly to the surface of the mandrel 28.

As will be noted from FIG. 1 and as mentioned above, the interior cavity of the mould 20 has a screw threaded shape, being provided with an internal helically extending screw thread 38.

The pitch of the thread 34 is the same as that of the thread 38, the mandrel 28 being shaped and sized so that it can be located in the mould spaced radially inwardly from the walls of the cavity of the mould 20, and so that the flights of the thread 34 are spaced axially from the flights of the thread 38. The mould 20 and mandrel 28 accordingly define, therebetween, an annular space 40 of screw-like shape. In this space 40 is provided a resiliently flexible hermetically continuous latex sheath 42, which fits around the mandrel 28 as a lining thereof, in abutment with the surface of the mandrel. The helically shaped space 40 accordingly exists between the sheath 42 and the inner surface of the mould 20.

In use, the jig 10 is set up as shown in FIG. 1, its being appreciated that the clamps 14 hold the housing 12 tightly against the outer cylindrical surface of the mould 12, and tightly against the plug 16 and the root 30 of the mandrel 28. The plug 16 accordingly seals one end of the housing 12, and the root 30 of mandrel 28, having the open end 44 of the sheath 42 sandwiched between it and the housing 12, seals the lower end of the housing.

To make an electrode holder in accordance with the invention, the jig 10 is set up as shown in FIG. 1, except that the plugs 16, 24 are left out, and the lowermost clamp 14, around the root 30 of the mandrel 28, is tightened sufficiently only to prevent powder from running downwardly out of the space 40.

A suitable powder such as $\beta$- or $\beta''$-alumina of a particle size such that 80% by mass thereof is less than 55 $\mu$m in size, is then charged into the space 40 between the sheath 42 and the mould 20, via the opening 22, with suitable vibration to compact and consolidate said powder. When the space 40 is filled with powder, the plug 24 is inserted into position, followed by the plug 16, and by final tightening of the clamps 14 to seal the housing 12 tightly against the plug 16 and root 30 of the mandrel 28.

Water is then introduced into the interior of the sheath 42 via the passage 36 and the various pinholes in the mandrel at a suitable pressure for isostatically pressing a green screw-shaped hollow electrode holder from the layer of powder, designated 46, filling the space 40. This pressure may, for example, be $34 \times 10^3$ psi.

It will be appreciated that the pinholes will be distributed over the surface of the stem 32 and threads 34 of the mandrel 28, to provide a layer of water under said pressure between the mandrel 28 and the sheath 42, this water pressing the sheath outwardly to consolidate said powder 46 against the inner surfaces of the cavity of the mould 20.

After the isostatic pressing by hydrostatic pressure, the water pressure is relieved, allowing the sheath 42 to spring back into contact with the mandrel 28, so that the sheath is spaced from and free of the green artifact formed from the powder 46.

At this stage, after relieving the clamps 14 and in particular the lowermost ,clamp 14, the mandrel 28 can be unscrewed axially downwardly, together with the sheath 42, from the interior of the green holder. The green holder can then be removed from the jig 10, by removing the clamps 14 and splitting the housing 12 and mould 20.

The electrode holder can then be sintered into a polycrystalline artifact by heating to a suitable temperature in air, e.g. in accordance with a heating schedule of the type described in U.S. Pat. No. 4,732,741, conveniently with the holder standing in an upright condition on an end thereof, to minimize contact between the holder and the surface of the furnace crucible. Instead, the green holder can be suspended in the furnace crucible or indeed placed on its side, in which conditions very little of the surface of the green holder will be in contact with any crucible surface.

A particular feature of the method is the initial introduction into the space 40 of an α-alumina powder of a similar particle size to that of the β- or β"-alumina, to form a ring of α-alumina at the mouth of the holder. This ring of α-alumina will be pressed and sintered together with the β- or β"-alumina of the holder, to provide a mouth for the sintered holder which is hermetically sintered thereto and integral therewith, but is ionically and electronically insulating.

Figure 2:
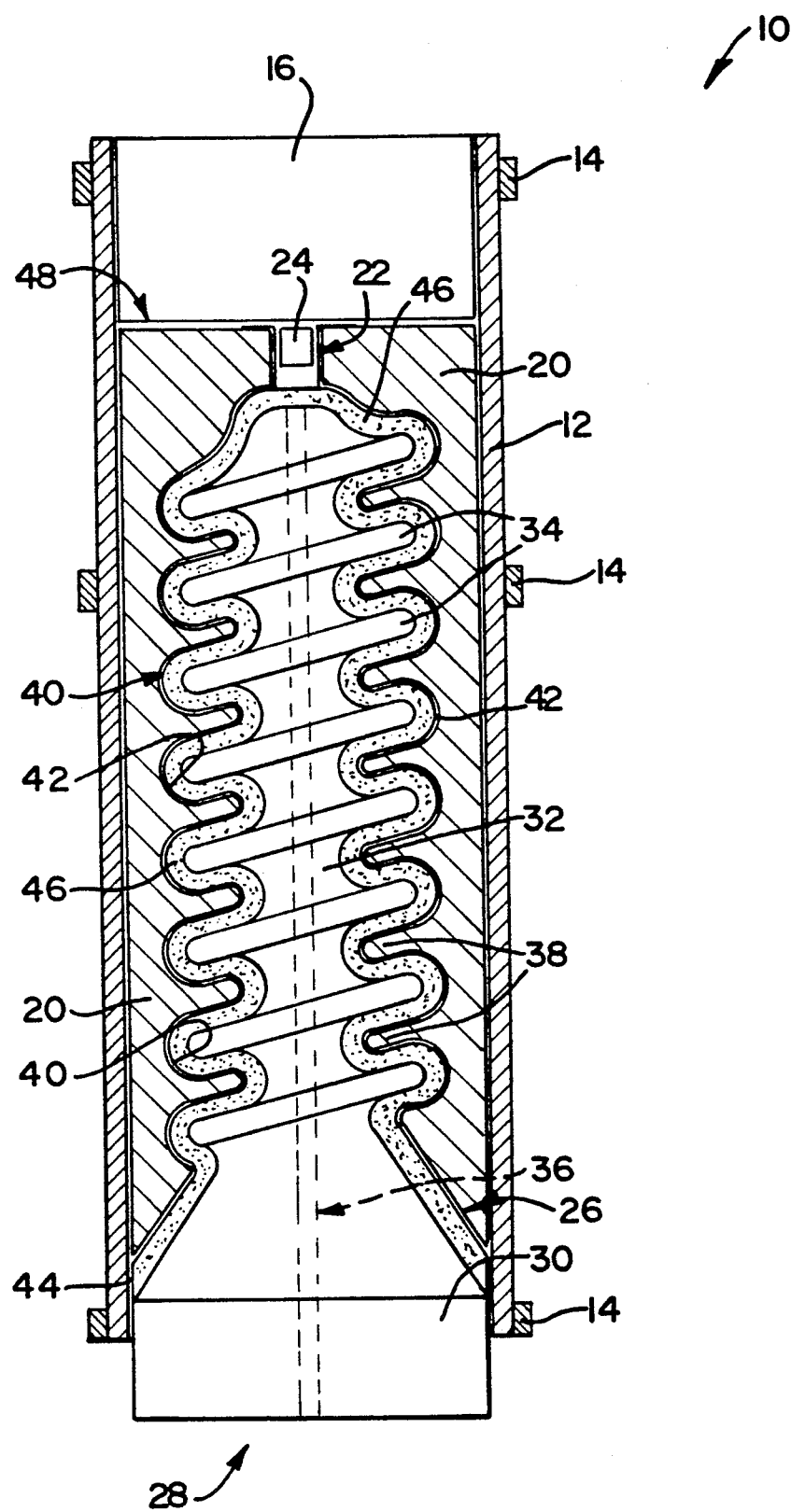
FIG. 2 shows a similar view of another apparatus according to the invention.

Turning to FIG. 2, the construction shown is similar to that of FIG. 1, and unless otherwise specified, the same reference numeral refer to the same parts.

Differences between FIG. 2 and FIG. 1 are that the passage 36 and pinholes of the mandrel 28 are omitted, and, instead, the mould 20 is provided with one or more suitable similar passages and a plurality of pinholes (not shown) which can communicate with the exterior eg via one or more suitable passages (also not shown) in the plug 16.

In the case of FIG. 2, the sheath 42, unlike FIG. 1, is in abutment with and forms a lining for the screw threaded interior surface of the mould 20, and instead of being closed at its upper end, is open, and project outwardly through the opening 22, having the periphery of its open upper end clamped between the plug 16 and the too of the mould 20, the plug 24 closing off said upper end.

In this case, the space 40 is between the sheath 42 and the screw threaded part of the mandrel 28. This space is filled with powder via the open upper end of the sheath 42 with vibration, and when the space 40 is filled to the extent shown in FIG. 2, with a small open space 48 above the powder as shown in FIG. 2, isostatic pressing takes place in an inward direction via the passages and pinholes, to press the sheath 42 against the powder and to press the powder against the mandrel 28.

After the pressing the pressure is relieved, the sheath 42 which is resiliently flexible and is shaped to conform automatically with the inner surfaces of the mould 20, springs back into contact with the mould 20, free of the green holder. The green holder and mandrel 28 can then, together, be unscrewed from the interior of the mould 20, in an axially downward direction, after the clamps 14 are released.

The mandrel 28 can then be unscrewed from the green holder, which is then fired as described above, to sinter it.

It should also be noted, with regard to FIG. 2, that the outer housing 12 can in fact be omitted, provided that the portions of the mould 20 are held together firmly during the pressing.

In a hybrid version of FIGS. 1 and 2, two sheaths can be provided, respectively lining the mandrel 28 and the inner surface of the mould 20, the powder being charged into the space 40 which will exist between said sheaths 42. In this case, after pressing, both sheaths will spring back, free of the green holder, facilitating both unscrewing of the mandrel from the interior of the green holder and unscrewing of the green holder from the mould 20.

Although a non-tapered mandrel 28 and mould 20 are shown in FIGS. 1 and 2, it will be appreciated that they may both taper upwardly, thereby facilitating the abovementioned unscrewing.

In FIGS. 3 and 4 two versions of holders shaped in accordance with the method of the invention are shown, each generally designated 50. Each of them has a central hollow shank or stem 52 and a single continuous thread 54, the flights of which are also hollow. These holders 50 have the flights of their threads 54 formed by the thread 38 of the mould 20 (FIGS. 1 and 2), and have the hollow interiors of said flights, which communicate with the hollow interice of the stem 52, formed by the thread 34 of the mandrel 23 (FIGS. 1 and 2). The upper ends of the holders 50 are closed at 56, and they have, at their lower ends, α-alumina collars 58 integral with the remainder thereof, which remainder is β- or β"-alumina. If desired, the lower ends of the holders 50 may be provided with tubular β-alumina extensions, at the lower ends of which the collars 53 are provided. The extensions are shown in broken lines at 60 in FIGS. 3 and 4. It will be appreciated in this regard that, during pressing as shown in FIG. 2, the sheath 42 is pressed into the space 48 above the powder enclosing the top of the mandrel 28, below the plug 24, to provide a closed upper end for the green holder.

It is an advantage of the invention in that it provides a simple and easily used method and apparatus for pressing green electrode holders of the type in question. These electrode holders, after sintering, are typically used to contain an electrode of a cell having a molten sodium anode, the anode either being located in the interior of the holder with the cathode outside it, or vice versa.

It is expected that when there is a small gap between the fins or flights of the thread 54, as shown in FIG. 3, the sodium anode will be provided in the interior of the holder, with a suitable cathode around the exterior of the holder 50, enclosing the thread 54; and filling the spaces between the flights or fins of the thread 54. However, when there is a larger gap between the fins or flights of the thread 54, as shown in FIG. 4, it is expected that the sodium of the anode will be outside of the holder 50, with the cathode material in the interior of the hollow stem 52, and filling the hollow interiors of the flights or fins of the thread 54.

I claim:

1. A method of making a solid electrolyte holder for an electrode for an electrochemical cell, the method comprising the steps of:
    forming a layer of particulate material comprising a solid electrolyte or a precursor thereof around a mandrel which is externally screw threaded;
    isostatically pressing the layer of particulate material to form the holder in a green state with internal screw threads formed by the threads of the mandrel;
    unscrewing the mandrel in an axial direction from the green holder; and
    sintering the green holder to provide the holder in the form of a unitary, polycrystalline ceramic solid electrolyte artifact, the layer of particulate material being isostatically pressed by means of a flexible sheath within which the mandrel is enclosed, the layer of particulate material in turn being enclosed by a mould which is internally screw threaded, the holder in the green state being formed with external screw threads formed by the threads of the mould, and the holder in the green state being removed from the mould after the pressing and before the sintering.

2. A method as claimed in claim 1, in which the particulate material is a powder and the layer of powder is isostatically pressed inwardly against the mandrel by means of the sheath which encloses the layer of powder, the sheath being located between the mould and the layer of powder.

3. A method as claimed in claim 2, in which the sheath is resiliently flexible and, prior to forming of the layer of powder, forms a lining for the mould, the powder being charged into a space between the sheath and the mandrel to form the layer of powder, the pressing being by fluid under pressure introduced into the mould outside the sheath, and the fluid pressure being relieved after the pressing to allow the sheath resiliently to spring back, free of the green holder, to line the mould, after which the mandrel and green holder are respectively unscrewed from the green holder and from the mould.

4. A method as claimed in claim 1, in which the particulate material is a powder and the layer of powder is isostatically pressed outwardly away from the mandrel against the mould by means of the sheath which is located between the mould and the layer of powder.

5. A method as claimed in claim 4, in which the sheath is resiliently flexible and, prior to forming of the layer of powder, forms a lining for the mandrel, the powder being charged into a space between the sheath and the mould to form the layer of powder, the pressing being by fluid under pressure introduced between the sheath and the mandrel, and the fluid pressure being relieved after the pressing to allow the sheath resiliently to spring back, free of the green holder, to line the mandrel, after which the mandrel and green holder are respectively unscrewed from the green holder and from the mould.

6. A method as claimed in claim 1, in which the particulate material is a powder and the mandrel and layer of powder are enclosed by a flexible outer sheath located in the mould, a flexible inner sheath being provided between the mandrel and the layer of powder, the layer of powder being pressed inwardly away form the mould by the outer sheath by fluid under pressure introduced into the mould outside the outer sheath, and simultaneously being pressed outwardly away from the mandrel by the inner sheath by fluid under pressure introduced between the inner sheath and the mandrel.

7. A method as claimed in claim 6, in which each sheath is resiliently flexible, the inner and outer sheath, prior to the forming of the powder layer respectively forming linings for the mandrel and the mould, the powder being introduced into a space between the sheaths to form the layer of powder and the fluid pressure respectively in the inner sheath and between the mould and the outer sheath being relieved after the pressing to allow the inner and outer sheaths to spring back resiliently respectively to line the mandrel and the mould, after which the mandrel and the green holder are respectively unscrewed from the green holder and from the mould.

* * * * *

UNITED STATES PATENT AND TRADEMARK OFFICE
CERTIFICATE OF CORRECTION

PATENT NO. : 5,269,988
DATED : Dec. 14, 1993
INVENTOR(S) : Johan Coetzer

It is certified that error appears in the above-indentified patent and that said Letters Patent is hereby corrected as shown below:

In Column 9, line 36 (claim 3), insert the word -- the -- between the word "to" and "forming".

In Column 10, line 7 (claim 4), delete the word "mould" and insert therefor -- mandrel --.

In Column 10, line 9 (claim 5), insert the word -- the -- between the words "to" and "forming".

In Column 10, line 25 (claim 6), delete the word "form" and insert therefor -- from --.

Column 10, line 32, (claim 7), delete "sheath" (2nd occurrence) and insert therefor -- sheaths --.

Signed and Sealed this

Fifth Day of July, 1994

Attest:

BRUCE LEHMAN

*Attesting Officer*  *Commissioner of Patents and Trademarks*